(12) United States Patent
Chai et al.

(10) Patent No.: US 9,503,309 B2
(45) Date of Patent: Nov. 22, 2016

(54) ETHERNET COMMUNICATION SYSTEM AND METHOD BASED ON MMC/SD INTERFACE

(75) Inventors: Hongfeng Chai, Shanghai (CN); Zhongguo Zhou, Shanghai (CN); Zhijun Lu, Shanghai (CN); Hongwen Meng, Shanghai (CN); Wei Guo, Shanghai (CN); Shuo He, Shanghai (CN); Yunfeng Xu, Shanghai (CN)

(73) Assignees: CHINA UNIONPAY CO., LTD., Shanghai (CN); EASTCOMPEACE SMART CARD CO., LTD., Guangdong (CN)

( * ) Notice: Subject to any disclaimer, the term of this patent is extended or adjusted under 35 U.S.C. 154(b) by 794 days.

(21) Appl. No.: 13/823,852

(22) PCT Filed: Sep. 15, 2011

(86) PCT No.: PCT/CN2011/001561
§ 371 (c)(1),
(2), (4) Date: Aug. 8, 2013

(87) PCT Pub. No.: WO2012/034361
PCT Pub. Date: Mar. 22, 2012

(65) Prior Publication Data
US 2013/0325994 A1    Dec. 5, 2013

(30) Foreign Application Priority Data
Sep. 17, 2010 (CN) .......................... 2010 1 0285785

(51) Int. Cl.
*H04L 29/10* (2006.01)
*H04L 29/08* (2006.01)
*G06F 3/06* (2006.01)

(52) U.S. Cl.
CPC ........... *H04L 29/10* (2013.01); *H04L 67/1097* (2013.01); *H04L 69/323* (2013.01); *H04L 69/324* (2013.01); *G06F 3/067* (2013.01); *G06F 3/0661* (2013.01)

(58) Field of Classification Search
CPC ............. H04L 67/1097; H04L 69/323; H04L 69/324; H04L 29/10; G06F 3/0661; G06F 3/067
See application file for complete search history.

(56) References Cited

U.S. PATENT DOCUMENTS 6,101,180 A * 8/2000 Donahue ............ H04B 7/18595
370/270
6,883,065 B1 * 4/2005 Pittelkow ............ G06F 11/0727
709/206

(Continued)

FOREIGN PATENT DOCUMENTS

| CN | 101084492 | 12/2007 |
|---|---|---|
| CN | 101136000 | 3/2008 |
| CN | 101383017 | 3/2009 |

(Continued)

OTHER PUBLICATIONS

Winsper, R., et al., "Universal Serial Bus Communications Class Subclass Specification for Ethernet Emulation Model Devices," Revision 1.0, Feb. 2, 2005, 42 pages, XP-002389885.

*Primary Examiner* — Arvin Eskandarnia
(74) *Attorney, Agent, or Firm* — Blakely Sokoloff Taylor & Zafman LLP

(57) ABSTRACT

The present invention is directed to an Ethernet communication method and system which are based on the MMC/SD interface. In the invention, the communication system includes at least one master device and at least one slave device, the at least one master device and the at least one slave device are connected via MMC/SD interface and communicate with each other on the Ethernet. The Ethernet communication method and system disclosed herein enables the device with the MMC/SD interface to act as a node in the network, and thus greatly expanding the application domain of such devices.

19 Claims, 9 Drawing Sheets

(56) References Cited

U.S. PATENT DOCUMENTS

2007/0083924 A1* 4/2007 Lu ................. H04L 63/0227
  726/13
2011/0250786 A1* 10/2011 Reid ................. H01R 27/02
  439/488

FOREIGN PATENT DOCUMENTS

| CN | 101674446 | 3/2010 |
| CN | 101789086 | 7/2010 |
| CN | 101789086 A | 7/2010 |
| WO | WO2006086729 A1 | 8/2006 |

* cited by examiner

| First field (bmType) | Second field (EEM type dependant) |
|---|---|

FIG.6

| bmType = Data (data packet) | Check status field (bmCRC) | Length field (Ethernet data frame) |

FIG.7

| bmType = Command (command packet) | Command type field (bmCMD) | Command parameter field (bmCMDParam) |
|---|---|---|

FIG.8

ETHERNET COMMUNICATION SYSTEM AND METHOD BASED ON MMC/SD INTERFACE

TECHNICAL FIELD

The present application is related to an Ethernet communication system and method, particularly, to an Ethernet communication system and method based on the MMC/SD interface.

BACKGROUND

Nowadays, with the increasing popularity of the applications of smart card, devices based on the MMC/SD (Multimedia Card/Secure Digital memory Card) interface are widely used in various fields. Traditional devices with the MMC/SD interface are mainly terminal devices (master devices, such as computer, handset and so forth) and memory card (slave devices, such as the MMC card, the SD card and so forth). Generally, the MMC/SD interface is used as the channel through which a master device reads/writes data from a slave device, that is, it is used in the master/slave mode (in other words, all communications are initiated by the master device). FIG. 1 is a typical flow chart of the signaling interaction of the MMC/SD interface. As shown in FIG. 1, the master device sends a CMD command, and then the slave device sends a response ERS. If there is data required to be transmitted, such data will be present on the data line of the interface. There are two kinds of data communications, READ and WRITE. The MMC/SD protocol defines 64 commands (CMD0-CMD63), part of which are reserved or assigned for particular purpose. Meanwhile, the MMC/SD protocol also defines that the communication data of the MMC/SD interface are transmitted in the unit referred to as "block". The size of a block is $2''\times512$ bytes, which can be set by the master device with a CMD16 (SET_BLOCKLEN) command. The operations of READ and WRITE can be performed with a single block or multiple blocks. Each READ or WRITE command may have parameters indicating the starting address of the READ/WRITE operation and the number of blocks to be read or wrote. Additionally, the read or write operation can be stopped by a CMD12 (STOP_TRANSMISSION) command. After each data transmission, the master device can obtain the current status of the slave device with a CMD13 (SEND_STATUS) command. This communication mode have high transmission rate, but its application field and functionality are limited.

With the rapid popularity and expansion of electronic network technology, various applications based on the Ethernet platform are emerging increasingly. The Ethernet based on TCP/IP protocol is a LAN technology which is most widely used today. FIG. 2 is a figure showing a typical structural model of the Ethernet based on the TCP/IP protocol. As shown in FIG. 2, the TCP/IP protocol stack typically includes an application layer, a transport layer, a network layer, a data link layer, and a physical layer. Generally, the physical layer interface is mainly in the form of a PCI network card, a USB network card, an optical fiber card, etc. Up to now, the MMC/SD interface has not been used as the network physical layer interface.

However, if the MMC/SD interface can not be used in the network communication, the advantages of the interface, such as high efficiency and simplicity, can not be fully utilized. Therefore, there is a need for providing an Ethernet communication method and system based on the MMC/SD interface.

SUMMARY

In order to cure the deficiencies of the existing solutions as described above, the present application proposes an Ethernet communication system and method based on the MMC/SD interface.

The object of the present invention is achieved by the technical solution as follows.

An Ethernet communication system based on the MMC/SD interface, comprises at least one master device and at least one slave device, the at least one master device and the at least one slave device are connected to each other through the MMC/SD interface and communicate with each other on the Ethernet.

In the embodiment disclosed above, preferably, when the at least one slave device sends application data to the at least one master device, the at least one slave device put the application data into a transmission buffer such that the at least one master device is capable of receiving it in manner of periodic polling.

In the embodiment disclosed above, preferably, each of the at least one master device includes a master controller, a master communication protocol stack device, and a master MMC/SD physical interface driver device, wherein the master controller is used for controlling the operation of the master communication protocol stack device and the master MMC/SD physical interface driver device. The master communication protocol stack device is used for transmitting and receiving the information for the master device. The master MMC/SD physical interface driver device is used for the transmission of the MMC/SD signaling on the hardware interface.

In the embodiment disclosed above, preferably, each of the at least one slave device includes a slave controller, a slave communication protocol stack device, and a slave MMC/SD physical interface driver device, wherein the slave controller is used for controlling the operation of the slave communication protocol stack device and the slave MMC/SD physical interface driver device. The slave communication protocol stack device is used for transmitting and receiving the information for the slave device. The slave MMC/SD physical interface driver device is used for the transmission of the MMC/SD signaling on the hardware interface.

In the embodiment disclosed above, preferably, the master communication protocol stack device includes an application layer module, a transport layer module, a network layer module, a data link layer module, an MMC/SD EEM layer module, and an MMC/SD protocol layer module, wherein the application layer module is used for performing network application program, the transport layer module and the network layer module are used for performing the functions of the Ethernet protocol, the data link layer module is used for performing the packaging of the Ethernet data frame, the MMC/SD EEM layer module is used for emulating the functions of the Ethernet card for the higher level of the protocol stack, the MMC/SD protocol layer module is used for performing the functions of the MMC/SD protocol stack to implement various MMC/SD commands supported by the MMC/SD protocol stack.

In the embodiment disclosed above, preferably, the slave communication protocol stack device includes an application layer module, a transport layer module, a network layer module, a data link layer module, an MMC/SD EEM layer module, and an MMC/SD protocol layer module, wherein the application layer module is used for performing network application program, the transport layer module and the network layer module are used for performing the functions of the Ethernet protocol, the data link layer module is used for performing the packaging of the Ethernet data frame, the MMC/SD EEM layer module is used for emulating the functions of the Ethernet card for the higher level of the protocol stack, the MMC/SD protocol layer module is used for performing the functions of the MMC/SD protocol stack to implement various MMC/SD commands supported by the MMC/SD protocol stack.

In the embodiment disclosed above, preferably, the data transmission format used by the MMC/SD EEM layer is the EEM packet, which consists of an EEM header field and an EEM payload field.

In the embodiment disclosed above, preferably, the EEM header field includes a first field and a second field, wherein the first field is used for defining the type of the EEM packet, and when the EEM packet is a data packet, the second field includes a check status field and a length field, and when the EEM packet is a command packet, the second field includes a command type field and a command parameter field.

In the embodiment disclosed above, preferably, the length filed is used for specifying the length of the payload field in the EEM packet, and the check status field is used for specifying the on/off state of the CRC checking of the Ethernet data frames.

In the embodiment disclosed above, preferably, the command type field is used for defining the type of the EEM command, and the command parameter field is used for defining the parameters of the command.

In the embodiment disclosed above, preferably, the command type field defines the following types of command:

(1) Echo command, for verifying the validity of the connection, (2) Echo Response command, for responding to the corresponding Echo command, (3) ResponseHint command, transmitted by the at least one slave device, for setting the minimal time interval for stopping a query when the at least one master device stops querying data from the at least one slave device, (4) ResponseCompleteHint command, transmitted by the at least one slave device, for notifying the at least one master device that there is no data to be transmitted now, (5) Tickle command, transmitted by the at least one master device, for notifying the at least one slave device of the timeout of the definite time for said ResponseComplete-Hint command.

In the embodiment disclosed above, preferably, the MMC/SD protocol stack layer modules of the at least one master device and the at least one slave device carries the EEM packet with the MMC/SD block respectively in any of the following ways: one EEM packet being contained in one MMC/SD block; multiple EEM packets being contained in one MMC/SD block; one EEM packet being contained in multiple MMC/SD blocks; and multiple separated EEM packets being contained in multiple MMC/SD blocks.

The object of the present invention may also be achieved by the following technical solutions.

An Ethernet communication method based on the MMC/SD interface, comprising step (A1): at least one master device and at least one slave device communicating with each other through the MMC/SD interface on the Ethernet.

In the embodiment disclosed above, preferably, step (A1) further comprises:

(B1) when the at least one master device transmits first application data to the at least one slave device, the at least one master device packaging an Ethernet data packet into an EEM packet by means of the first MMC/SD EEM layer, and sending the EEM data packet to the at least one slave device through the MMC/SD interface;

(B2) when the at least one slave device transmits second application data to the at least one master device, the at least one slave device packaging an Ethernet data packet into an EEM packet by means of a second MMC/SD EEM layer, and putting the EEM data packet into a transmission buffer such that the at least one master device is capable of reading it in manner of periodic polling.

In the embodiment disclosed above, preferably, step (B1) further comprises:

(C1) the transport layer and the network layer in the at least one master device processing the first application data orderly, and constructing an Ethernet data packet from the first application data, (C2) the data link layer in the at least one master device packaging the Ethernet data packet into an Ethernet data frame, (C3) the first MMC/SD EEM layer constructing an EEM packet from the Ethernet data frame, and selecting an appropriate MMC/SD command to transmit the EEM packet in the form of MMC/SD data blocks, (C4) the MMC/SD protocol layer and the MMC/SD hardware interface driver device in the at least one master device processing the MMC/SD command and sending the MMC/SD data blocks to the at least one slave device, (C5) the MMC/SD protocol layer and the MMC/SD hardware interface driver device in the at least one slave device processing the MMC/SD command to receive the MMC/SD data blocks, (C6) the second MMC/SD EEM layer in the at least one slave device obtaining the EEM packet from the received MMC/SD data blocks, and if the EEM packet is an EEM command packet, then the second MMC/SD EEM layer using the EEM command packet itself, and if the EEM packet is an EEM data packet, the second MMC/SD EEM layer obtaining the Ethernet data frame from the EEM data packet and uploading the Ethernet data frame to an upper layer;

(C7) the data link layer of the at least one slave device obtaining the Ethernet data packet from the Ethernet data frame and uploading the Ethernet data packet to an upper layer;

(C8) the transport layer and the network layer of the at least one slave device processing the Ethernet data packet to obtain the first application data, and uploading the first application data to an upper layer.

In the above embodiment, preferably, step (B2) further comprises:

(D1) the transport layer and the network layer in the at least one slave device processing the second application data orderly and constructing an Ethernet data packet from the second application data, (D2) the data link layer in the at least one slave device packaging the Ethernet data packet into an Ethernet data frame, (D3) the second MMC/SD EEM layer in the at least one slave device constructing an EEM packet from the Ethernet data frame, and putting the EEM packet in a buffer in the form of MMC/SD data blocks to wait for the master device to read, (D4) the first MMC/SD EEM layer in the at least one master device sending READ commands in manner of periodic polling, wherein the MMC/SD protocol layer and the MMC/SD hardware interface driver device in the at least one master device process the READ command to receive the MMC/SD data blocks, (D5) the first MMC/SD EEM layer in the at least one master device obtaining the EEM packet from the received MMC/SD data blocks, and if the EEM packet is an EEM command packet, then the first MMC/SD EEM layer using the EEM command packet itself, and if the EEM packet is an EEM data packet, the first MMC/SD EEM layer obtaining the Ethernet data frame from the EEM data packet and uploading the Ethernet data frame to an upper layer;

(D6) the data link layer of the at least one master device obtaining the Ethernet data packet from the Ethernet data frame and uploading the Ethernet data packet to an upper layer;

(D7) the transport layer and the network layer of the at least one master device processing the Ethernet data packet to obtain the second application data, and uploading the second application data to an upper layer.

In the embodiment disclosed above, preferably, the Ethernet data packet is an IP data packet.

In the embodiment disclosed above, preferably, the data transmission format employed by the MMC/SD EEM layer is an EEM packet, which consists of an EEM header field and an EEM payload field.

In the embodiment disclosed above, preferably, the EEM header field includes a first field and a second field, wherein the first field is used for defining the type of the EEM packet, and when the EEM packet is a data packet, the second field includes a check status field and a length field, and when the EEM packet is a command packet, the second field includes a command type field and a command parameter field.

In the embodiment disclosed above, preferably, the length filed is used for specifying the length of the payload field in the EEM packet, and the check status field is used for specifying the on/off state of the CRC checking of the Ethernet data frames.

In the embodiment disclosed above, preferably, the command type field is used for defining the type of the EEM command, and the command parameter field is used for defining the parameters of the command.

In the embodiment disclosed above, preferably, the MMC/SD protocol layers of the at least one master device and the at least one slave device carries the EEM packet with the MMC/SD blocks respectively in any of the following ways: one EEM packet contained in one MMC/SD block; multiple EEM packets contained in one MMC/SD block; one EEM packet contained in multiple MMC/SD blocks; and multiple separated EEM packets contained in multiple MMC/SD blocks.

The Ethernet communication method and system based on the MMC/SD interface disclosed in the present invention have the following advantages: the present invention enables a device with the MMC/SD interface to act as a node in the network, and thereby the application domain of the device with the MMC/SD interface is greatly expanded in that existing network application becomes usable.

BRIEF DESCRIPTION OF THE DRAWINGS

The technical features and advantages of the present invention will be better understood by the skilled in the art, in connection with the accompany drawings, wherein:

FIG. 6 is a structural drawing of the header of an EEM packet of an embodiment of an Ethernet communication system based on the MMC/SD interface according to the present invention;

FIG. 7 is a structural drawing of the header of an EEM data packet of an embodiment of an Ethernet communication system based on the MMC/SD interface according to the present invention;

FIG. 8 is a structural drawing of the header of an EEM command packet of an embodiment of an Ethernet communication system based on the MMC/SD interface according to the present invention;

DETAILED DESCRIPTION

Figure 1:
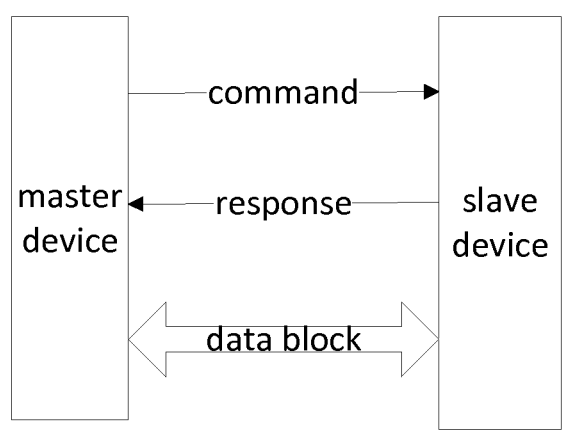
FIG. 1 is a flow chart of the signaling interaction of a traditional MMC/SD interface.
Figure 2:
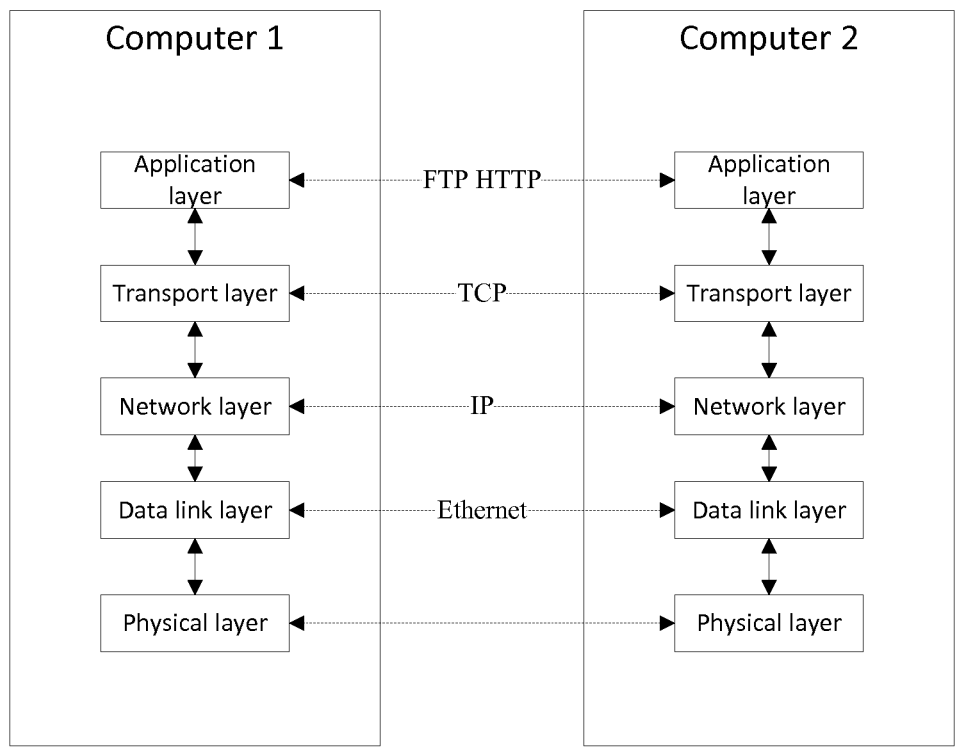
FIG. 2 is a figure showing a structural model of the Ethernet based on the TCP/IP protocol.
Figure 3:
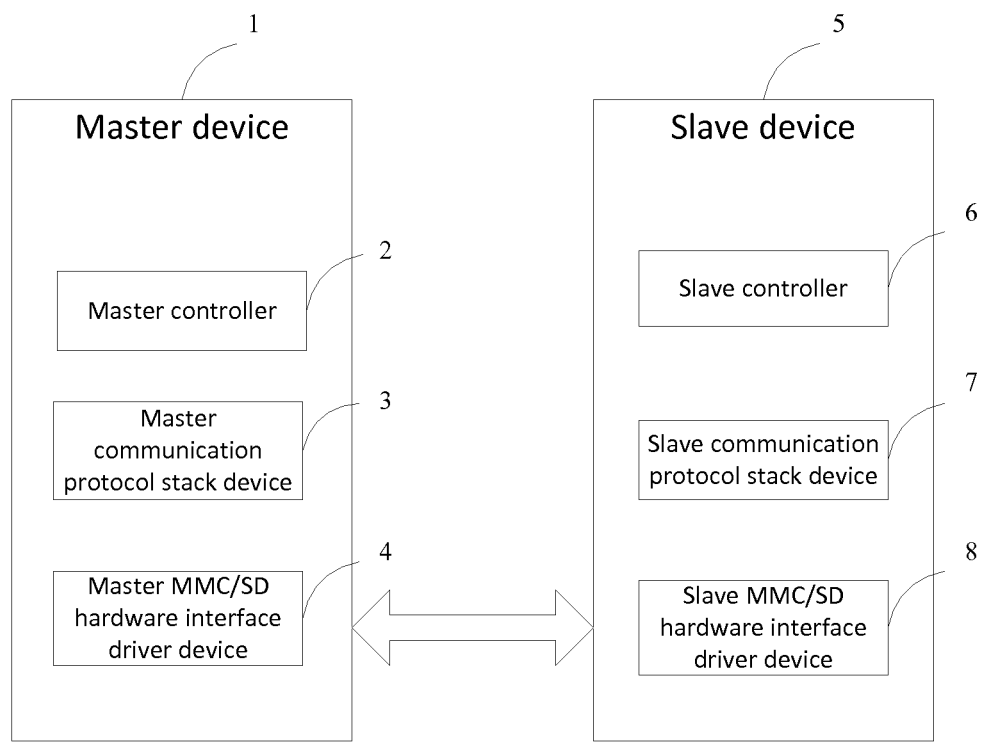
FIG. 3 is a structural drawing of an embodiment of an Ethernet communication system based on the MMC/SD interface according to the present invention.

FIG. 3 is a structural drawing of an embodiment of an Ethernet communication system based on the MMC/SD interface according to the present invention. As shown in FIG. 3, the Ethernet communication system based on the MMC/SD interface as disclosed in the present invention includes at least one master device 1 and at least one slave device 5, the at least one master device 1 and the at least one slave device 5 are connected with each other through an MMC/SD interface. Each of the at least one master device 1 includes a master controller 2, a master communication protocol stack device 3, a master MMC/SD hardware interface driver device 4. Each of the at least one slave device 5 includes a slave controller 6, a slave communication protocol stack device 7, a slave MMC/SD hardware interface driver device 8. The master controller 2 is used for controlling the operation of the master communication protocol stack device 3 and the master MMC/SD hardware interface driver device 4. The master communication protocol stack device 3 are used for sending and receiving the information for the at least one master device 1. The master MMC/SD hardware interface driver device 4 is used for performing the transmission of the MMC/SD signaling on the hardware interface. Similarly, the slave controller 6 is used for controlling the operation of the slave communication protocol stack device 7 and the slave MMC/SD hardware interface driver device 8. The slave communication protocol stack device 7 are used for sending and receiving the information for the at least one slave device 5. The slave MMC/SD hardware interface driver device 8 is used for performing the transmission of the MMC/SD signaling on the hardware interface. The at least one master device 1 and the at least one slave device 5 can also include various general-purpose or dedicated external devices.

Figure 4:
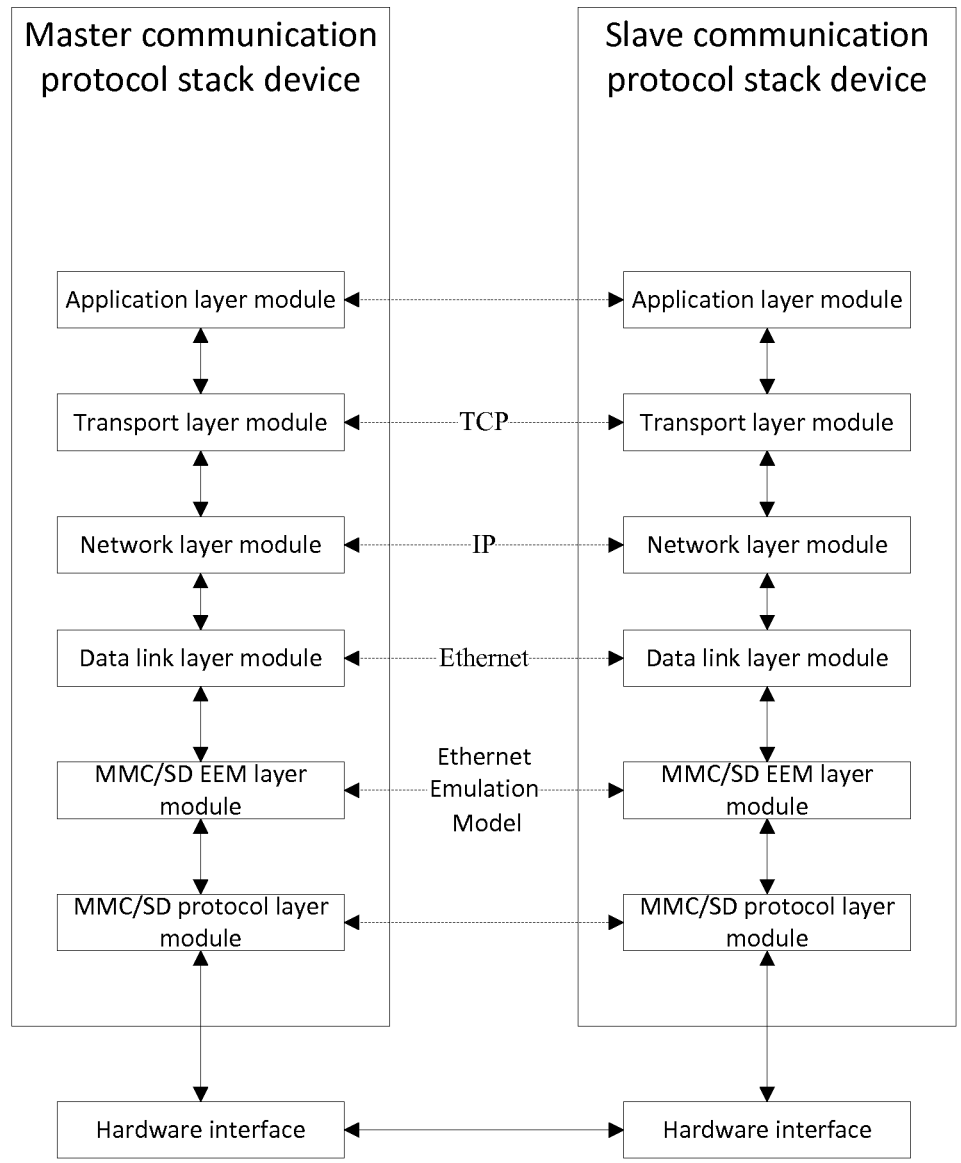
FIG. 4 is a structural drawing of a communication protocol stack of an embodiment of an Ethernet communication system based on the MMC/SD interface according to the present invention.

FIG. 4 is a structural drawing of a communication protocol stack of an embodiment of an Ethernet communication system based on the MMC/SD interface according to the present invention. As shown in FIG. 4, the master communication protocol stack device 3 includes an application layer module, a transport layer module, a network layer module, a data link layer module, an MMC/SD EEM (Ethernet emulation model) layer module, and an MMC/SD protocol layer module. The application layer module is used for performing network application program, such as TFTP, HTTP, etc. The transport layer module and the network layer module are used for performing the functions of the Ethernet protocol, such as TCP/IP. The data link layer module is used for performing the packaging of the Ethernet data frame. The MMC/SD EEM layer module is used for emulating the functions of the Ethernet card for the upper level of the protocol stack. The MMC/SD protocol layer module is used for performing the functions of the MMC/SD protocol stack to implement various MMC/SD commands supported by the MMC/SD protocol stack. As can be appreciated by one skilled in the art, the master communication protocol stack device 3 is not limited to above hierarchy. Several relevant layers, such as the transport layer module and the network layer module, may be combined as desired. Moreover, the MMC/SD protocol layer module and the master MMC/SD hardware interface driver device 4 can also be combined as desired.

Similarly, as shown in FIG. 4, the slave communication protocol stack device 7 also includes an application layer module, a transport layer module, a network layer module, a data link layer module, an MMC/SD EEM (Ethernet emulation model) layer module, and an MMC/SD protocol layer module. The application layer module is used for performing network application program, such as TFTP and HTTP. The transport layer module and the network layer module are used for performing the functions of the Ethernet protocol, such as TCP/IP. The data link layer module is used for performing the packaging of the Ethernet data frame. The MMC/SD EEM layer module is used for emulating the functions of the Ethernet card for the upper level of the protocol stack. The MMC/SD protocol layer module is used for performing the functions of the MMC/SD protocol stack to implement various MMC/SD commands supported by the MMC/SD protocol stack. As can be appreciated by one skilled in the art, the slave communication protocol stack device 7 is not limited to above hierarchy. several relevant layers, such as the transport layer module and the network layer module, may be combined as desired. Moreover, the MMC/SD protocol layer module and the slave MMC/SD hardware interface driver device 8 may also be combined as desired.

As shown in FIG. 4, the same layers in the at least one master device 1 and the at least one slave device 5 are corresponding to each other. The layers above the MMC/SD EEM layer is consistent with the TCP/IP network model, and the layers below the MMC/SD EEM layer are consistent with the MMC/SD protocol model, wherein the MMC/SD EEM layer implement the connection between the upper and lower layers.

As shown in FIG. 4, the basic work flow of the Ethernet communication system based on the MMC/SD interface disclosed by the present invention is as follows: when the data is being transmitted, the data from the application layer is transmitted downward layer by layer and finally sent by the MMC/SD hardware interface; when the data is being received, the data to be received is obtained from the MMC/SD hardware interface and then transmitted upward layer by layer. As can be appreciated by one skilled in the art, according to different requirements, the data flow is not required to start from the application layer, and may start from a middle layer, such as the MMC/SD EEM layer. The data flow is also not required to pass through these layers subsequently, and may skip some layers.

Figure 5:
FIG. 5 is a structural drawing of an EEM packet of an embodiment of an Ethernet communication system based on the MMC/SD interface according to the present invention.

The data transmission formats of the top four layers in the communication protocol stack disclosed herein follow the TCP/IP protocol stack. For example, the data format of the network layer is the IP packet, and the data format of the data link layer is the Ethernet data frame. The MMC/SD EEM layer disclosed herein employs the data transmission format defined by EEM packet. FIG. 5 is a structural drawing of an EEM packet of an embodiment of an Ethernet communication system based on the MMC/SD interface according to the present invention. As shown in FIG. 5, the EEM packet consists of an EEM header field and a payload field, such as the Ethernet data frame.

FIG. 6 is a structural drawing of the header of an EEM packet of an embodiment of an Ethernet communication system based on the MMC/SD interface according to the present invention. As shown in FIG. 6, the header field of the EEM packet includes a first field (indicated by bmType) and a second field (indicated by EEM type dependant). The first field defines the type of the EEM packet, that is, a data packet (indicated by EEM Data Packet) or a command packet (indicated by EEM Command Packet). The second field has different structures depending on different types.

FIG. 7 is a structural drawing of the header of an EEM data packet of an embodiment of an Ethernet communication system based on the MMC/SD interface according to the present invention. As shown in FIG. 7, the EEM data packet is used for carrying the Ethernet data frame to transfer network data. The second field of the header of the EEM data packet includes a check status field and a length field. The length field is used for specifying the length of the payload (i.e. the Ethernet data frame) in the EEM data packet. The check status field (bmCRC) specifies the on/off state of the CRC checking of the Ethernet data frame.

FIG. 8 is a structural drawing of the header of an EEM command packet of an embodiment of an Ethernet communication system based on the MMC/SD interface according to the present invention. As shown in FIG. 8, the EEM command packet is used for controlling the emulated Ethernet interface. The second field of the header of the EEM command packet includes a command type field and a command parameter field. The command type field (bmCMD) defines the type of the EEM command, and the command parameter field (bmPara) defines the parameters of the command. In one embodiment of the present invention, the command type field may define the following command types:

(1) Echo command, for verifying the validity of the connection; the echo command can be used by both the master device 1 and the slave device 5, wherein when any device receives the Echo command, the device shall send an Echo Response command using the data in the same payload fields;

(2) Echo Response command, for responding to the corresponding Echo command, (3) ResponseHint command, transmitted by the slave device 5, for setting the minimal time interval of stopping a query when the master device 1 stops querying data from the slave device 5; this command may also be ignored by the master device 1;

(4) ResponseCompleteHint command, transmitted by the slave device 5, for notifying the master device 1 that there is no data to be transmitted; when this command is received, the master device 1 may stop the query until there is data to be sent by the master device 1 or a definite time is reached, or the master device 1 may also ignore the command; when the definite time is reached and there is no data to be sent by the master device 1, the master device 1 may send a Tickle command to the slave device 5; however, since the master device 1 can ignore the command, it is uncertain that the slave device 5 can receive the Tickle command when the definite time is reached;

(5) Tickle command, transmitted by the master device 1, for notifying the slave device 5 that the definite time for the ResponseCompleteHint command is reached. However, since the master device 1 may ignore the ResponseCompleteHint command, it is uncertain that the slave device 5 can receive the Tickle command when the definite time is reached.

As can be appreciated by one skilled in the art, in addition to above commands, the set of commands can be expanded as required as long as the data length range of the command type field (bmCMD) is not exceeded.

As can be seen, the EEM packet from the MMC/SD EEM layer will be transmitted to the MMC/SD protocol layer and the MMC/SD hardware interface driver device, and finally transmitted through the MMC/SD hardware interface. Or instead, the EEM packet can be received by the MMC/SD EEM layer from the MMC/SD protocol layer and the MMC/SD hardware interface driver device.

According to the MMC/SD protocol, the data communicated through the MMC/SD interface are transferred in the unit referred to as "block", and the size of a block is $2^n \times 512$ bytes. Meanwhile, according to the RFC 894 specification, the size of an Ethernet data frame is 64-1518 bytes. Thus, assume that the size of the block is BLOCK_LEN (for example, 512 bytes), if the length of the EEM packets to be sent or received is within BLOCK_LEN, the MMC/SD EEM layer may call the single-block READ/WRITE command (CMD17/CMD24) of the MMC/SD protocol layer and may send or receive the EEM packet through the hardware interface controlled by the MMC/SD hardware interface driver device; if the length of the EEM packets to be sent or received is greater than BLOCK_LEN, the MMC/SD EEM layer may call the multi-block READ/WRITE command (CMD18/CMD25) of the MMC/SD protocol layer. If there is a interspace between packets, the interspace may be filled with any characters that do not interference the unpacking operation (for example, 0x0). The EEM packets can be carried by the MMC/SD blocks in any of the following ways: one EEM packet contained in one MMC/SD block; multiple EEM packets contained in one MMC/SD block; one EEM packet contained in multiple MMC/SD blocks; and multiple separated EEM packets contained in multiple MMC/SD blocks.

In addition, according to the MMC/SD protocol, it is required that the parameters of the block READ/WRITE commands (CMD17/CMD24, or CMD18/CMD25) contains the starting address of the blocks that are read/written. Accordingly, for an EEM packet, the starting address can be specified as 0. As can be appreciated by one skilled in the art, the starting address is not limited to 0, and any starting address may be employed as long as the processing at the master device 1 and the slave device 5 is consistent.

In the Ethernet communication system based on the MMC/SD interface according to the present invention, the data transmission process at the MMC/SD EEM layer can be divided into the following two types: (1) The master device 1 sends the data and the slave device 5 receives it, wherein the data transmission process is as follows: (a) The data from the application layer of the master device 1 is processed by the transport layer module and the network layer module of the master communication protocol stack device 3 to form a network layer IP data packet which is sent to the data link layer module, and then the data link layer module packages the network layer data packet into an Ethernet data frame which is handled by the MMC/SD EEM layer module, wherein the MMC/SD EEM layer module adds an EEM header at the header of the Ethernet data frame to form an EEM data packet, and then assembles the EEM packets into a single or multiple MMC/SD data blocks according to the size of the EEM packet(s) to be sent, subsequently, calls the command CMD24 (the single-block WRITE command) or the command CMD25 (the multi-block WRITE command) in the MMC/SD protocol to send out the MMC/SD data blocks from the hardware interface by means of the MMC/SD protocol layer module and the MMC/SD hardware interface driver device, and wherein the EEM command packet is established directly by the MMC/SD EEM layer module, and is not directly related to the application layer or the network protocol stack, and is mainly used for controlling the network interface. (b) The receiving procedure at the slave device 5 is as follows: the MMC/SD protocol layer module and the MMC/SD hardware interface driver device in the slave communication protocol stack 7 receive the single or multiple MMC/SD data blocks from the hardware interface, and send them to the MMC/SD EEM layer module; the MMC/SD EEM layer module obtains a single or multiple EEM packets from the MMC/SD data blocks, and determines the type of the EEM packets (i.e., data packets or command packets) according to the header of the EEM packets; if the EEM packets are EEM command packets, they will be handled directly by the MMC/SD EEM layer module, and if they are EEM data packets, then the EEM header of the packets will be removed to obtain the Ethernet data frame which will be sent to the data link layer module; the data link layer module obtains the IP data packet from the Ethernet data frame, and then the IP data packet is processed by the transport layer module and the network layer module, subsequently, the related application layer data will be processed by the application layer; (2) The slave device 5 sends the data and the master device 1 receives it, wherein the data transmission process is as follows: the data from the application layer of the slave device 5 is processed by the transport layer module and the network layer module of the slave communication protocol stack device 7 to form a network layer IP data packet which is sent to the data link layer module, and then the data link layer module packages the network layer data packet into an Ethernet data frame which is processed subsequently by the MMC/SD EEM layer module, and then the MMC/SD EEM layer module adds an EEM header at the header of the Ethernet data frame to form an EEM data packet, subsequently, assembles the EEM data packets into a single or multiple MMC/SD data blocks according to the size of the EEM packet(s) to be sent, and wherein the EEM command packet is established directly by the MMC/SD EEM layer module, and since the transmission of MMC/SD is carried out in master/slave mode, that is, all of the transmission must be initiated by the master device 1, the prepared data blocks are put into a transmission buffer to wait for the master device 1 to read.

According to the embodiment of the present invention, the data transmission of the slave device 5 is implemented in such manner that the master device 1 periodically polling the slave device 5, which operation is performed by the MMC/SD EEM layer module in the master communication protocol stack device 3 of the master device 1. As can be appreciated by one skilled in the art, the specific implementation is not limited to a particular way, and may employ any means with polling function such as a timer, an operation system service, a kernel thread of the operation system, etc. After the MMC/SD EEM layer module calls the MMC/SD protocol layer module and the MMC/SD hardware interface driver device using a READ command and reads useful single or multiple MMC/SD data blocks from the hardware interface, it is determined whether the EEM packet is a command packet or a data packet according to the header of the EEM packet. If the EEM packets are EEM command packets, they will be handled directly by the MMC/SD EEM layer module, and if they are EEM data packets, then the EEM header of the packets will be removed to obtain the Ethernet data frame which will be handled subsequently by the data link layer module. The data link layer module obtains the IP data packet from the Ethernet data frame, and then the IP data packet is processed by the transport layer module and the network layer module, and finally, the related application layer data will be processed by the application layer module.

As can be appreciated by one skilled in the art, the IP data packet is just an example of the network layer data packet, and the data packet may also be an ARP data packet, an RARP data packet, or the like. Moreover, the data flow does not necessarily start from the application layer (for example, the synchronization packet for TCP is constructed by the transport layer.)

According to the Ethernet communication system based on the MMC/SD interface disclosed herein, the master device 1 and the slave device 5 may establish network communication by means of using the MMC/SD EEM layer module. The master device 1 and the slave device 5 can conduct network communication by means of using the existing network application. Meanwhile, as long as one of the master device 1 and the slave device 5 can gain access to another network (for example, the Internet), the other can also gain access to said network as a network node.

Figure 9:
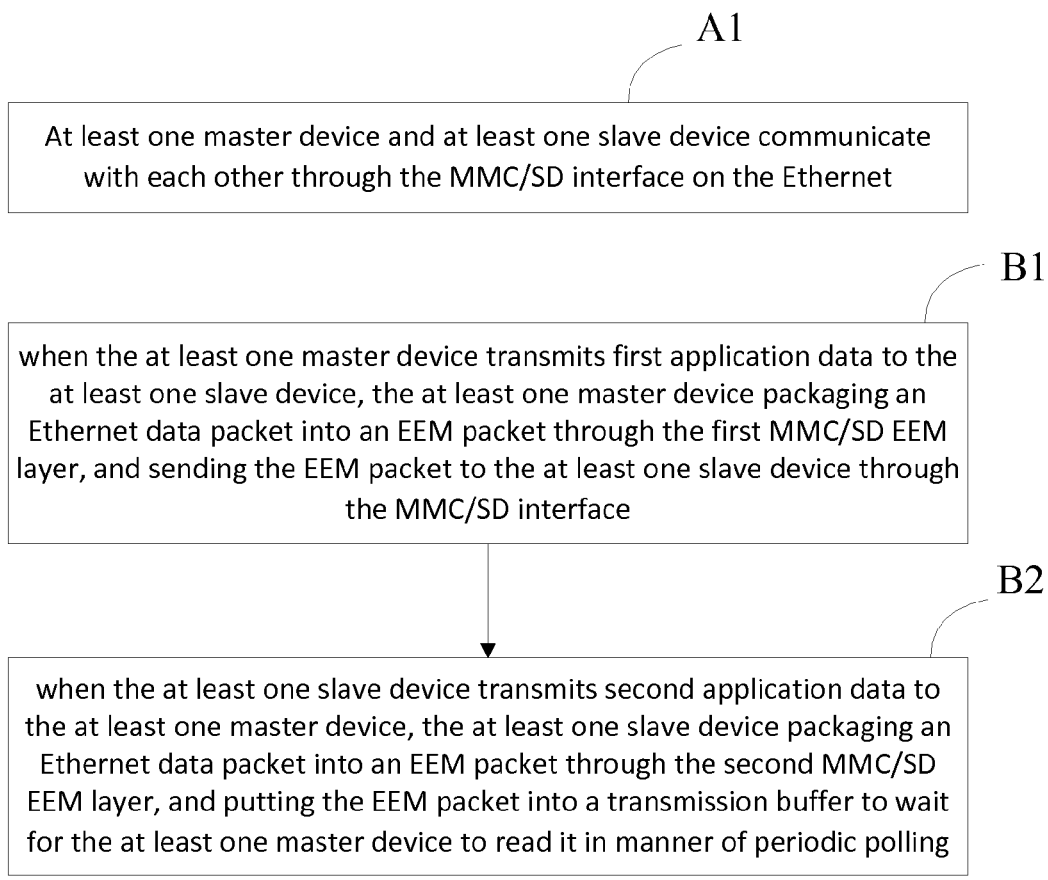
FIG. 9 is a flow chart of an Ethernet communication method based on the MMC/SD interface according to the present invention.

FIG. 9 is a flow chart of an Ethernet communication method based on the MMC/SD interface according to the present invention. As shown in FIG. 9, the Ethernet communication method based on the MMC/SD interface disclosed herein including the following steps: (A1) at least one master device and at least one slave device communicating with each other through the MMC/SD interface on the Ethernet. In the method, step (A1) further comprises: (B1) when the at least one master device transmits a first application data to the at least one slave device, the at least one master device packaging an Ethernet data packet into an EEM packet by means of the first MMC/SD EEM (Ethernet Emulation model) layer, and sending the EEM packet to the at least one slave device through the MMC/SD interface; and (B2) when the at least one slave device transmits a second application data to the at least one master device, the at least one slave device packaging an Ethernet data packet into an EEM packet through the second MMC/SD EEM (Ethernet Emulation model) layer, and putting the EEM packet into a transmission buffer to wait for the at least one master device to read it in manner of periodic polling.

According to the Ethernet communication method based on the MMC/SD interface disclosed herein, step (B1) further comprises: (C1) the transport layer and the network layer in the at least one master device processing the first application data orderly, and constructing an Ethernet data packet (for example, an IP data packet) from the first application data; (C2) the data link layer in the at least one master device packaging the Ethernet data packet into an Ethernet data frame; (C3) the first MMC/SD EEM (Ethernet Emulation model) layer constructing an EEM packet from the Ethernet data frame, and selecting an appropriate MMC/SD command to transmit the EEM packet in the form of MMC/SD data blocks; (C4) the MMC/SD protocol layer and the MMC/SD hardware interface driver device in the at least one master device processing the MMC/SD command and sending the MMC/SD data blocks to the at least one slave device; (C5) the MMC/SD protocol layer and the MMC/SD hardware interface driver device in the at least one slave device processing the MMC/SD command to receive the MMC/SD data blocks; (C6) the second MMC/SD EEM (Ethernet Emulation model) layer in the at least one slave device obtaining the EEM packet from the received MMC/SD data blocks, and if the EEM packet is an EEM command packet, then the second MMC/SD EEM (Ethernet Emulation model) layer using the EEM command packet itself, and if the EEM packet is an EEM data packet, the second MMC/SD EEM (Ethernet Emulation model) layer obtaining the Ethernet data frame from the EEM data packet and uploading the Ethernet data frame to the upper layer; (C7) the data link layer of the at least one slave device obtaining the Ethernet data packet (for example, the IP data packet) from the Ethernet data frame and uploading the Ethernet data packet to the upper layer; and (C8) the transport layer and the network layer of the at least one slave device processing the Ethernet data packet (for example, the IP data packet) to obtain the first application data, and uploading it to the upper layer.

According to the Ethernet communication method based on the MMC/SD interface disclosed herein, step (B2) further comprises: (D1) the transport layer and the network layer in the at least one slave device processing the second application data orderly and constructing an Ethernet data packet (for example, the IP data packet) from the second application data; (D2) the data link layer in the at least one slave device packaging the Ethernet data packet into an Ethernet data frame; (D3) the second MMC/SD EEM (Ethernet Emulation model) layer in the at least one slave device constructing an EEM packet from the Ethernet data frame, and putting the EEM packet in a buffer in the form of MMC/SD data blocks to wait for the at least master device to read; (D4) the first MMC/SD EEM (Ethernet Emulation model) layer in the at least one master device sending READ commands in manner of periodic polling, wherein the MMC/SD protocol layer and the MMC/SD hardware interface driver layer in the at least one master device process the READ commands to receive the MMC/SD data blocks; (D5) the first MMC/SD EEM (Ethernet Emulation model) layer in the at least one master device obtaining the EEM packet from the received MMC/SD data blocks, and if the EEM packet is an EEM command packet, then the first MMC/SD EEM (Ethernet Emulation model) layer using the EEM command packet itself, and if the EEM packet is an EEM data packet, the first MMC/SD EEM (Ethernet Emulation model) layer obtaining the Ethernet data frame from the EEM data packet and uploading the Ethernet data frame to the upper layer; (D6) the data link layer of the at least one master device obtaining the Ethernet data packet (for example, the IP data packet) from the Ethernet data frame and uploading the Ethernet data packet to the upper layer; and (D7) the transport layer and the network layer of the at least one master device processing the Ethernet data packet (for example, the IP data packet) to obtain the second application data, and uploading the second application data to the upper layer.

According to the Ethernet communication method based on the MMC/SD interface disclosed herein, the data transmission formats of the top four layers in the communication protocol stack follow the TCP/IP protocol stack. For example, the data format of the network layer is the IP packet, and the data format of the data link layer is the Ethernet data frame. The MMC/SD EEM layer employs the data transmission format of EEM packet, which consists of an EEM Header field and a payload field, such as the Ethernet data frame.

The header of the EEM packet includes a first field (indicated by bmType) and a second field (indicated by EEM type dependant). The first field defines the type of the EEM packet, that is, a data packet (indicated by EEM Data Packet) or a command packet (indicated by EEM Command Packet). The second field has different structures depend on different types.

The EEM data packet is used for carrying the Ethernet data frame to transfer the network data. The second field of the header of the EEM data packet includes a check status field and a length field. The length field is used for specifying the length of the payload (i.e. the Ethernet data frame) in the EEM data packet. The check status field (bmCRC) specifies the on/off state of the CRC checking of the Ethernet data frame.

The EEM command packet is used for controlling the emulated Ethernet interface. The second field of the header of the EEM command packet includes a command type field and a command parameter field. The command type field (bmCMD) defines the type of the EEM command, and the command parameter field (bmPara) defines the parameters of the command. In one embodiment of the present invention, the command type field may define the following command types:

(1) Echo command, for verifying the validity of the connection; the echo command can be used by both the master device and the slave device, wherein when any device receives the Echo command, the device shall send an Echo Response command using the data in the same payload fields;

(2) Echo Response command, for responding to a corresponding Echo command, (3) ResponseHint command, transmitted by the slave device, for setting the minimal time interval of stopping a query when the master device stops querying data from the slave device; this command may also be ignored by the master device;

(4) ResponseCompleteHint command, transmitted by the slave device, for notifying the master device that there is no data to be transmitted, and when this command is received, the master device may stop the query until=there is data to be sent by the master device or a definite time is reached, or the master device may ignore the command, and when the definite time is reached and there is no data to be sent by the master device, the master device may send a Tickle command to the slave device, however, since the master device may ignore the command, it is uncertain that the slave device can receive the Tickle command when the definite time is reached;

(5) Tickle command, transmitted by the master device, for notifying the slave device that the definite time for the ResponseCompleteHint command is reached, however, since the master device may ignore the ResponseCompleteHint command, it is uncertain that the slave device can receive the Tickle command when the definite time is reached.

As can be appreciated by one skilled in the art, in addition to above commands, the set of commands can be expaned as required as long as the data length range of the command type field (bmCMD) is exceeded.

As can be seen, the EEM packet from the MMC/SD EEM layer will be transmitted to the MMC/SD protocol layer and the MMC/SD hardware interface driver device, and finally transmitted through the MMC/SD hardware interface. Or instead, the EEM packet can be received by the MMC/SD EEM layer from the MMC/SD protocol layer and the MMC/SD hardware interface driver device.

According to the MMC/SD protocol, the data communicated on the MMC/SD interface are transferred in the unit referred to as "block", and the size of a block is $2^n \times 512$ bytes. Meanwhile, according to the RFC 894 specification, the size of an Ethernet data frame is 64-1518 bytes. Thus, assume that the size of the block is BLOCK_LEN (for example, 512 bytes), if the length of the EEM packets to be sent or received is within BLOCK_LEN, the MMC/SD EEM layer can call the single-block READ/WRITE command (CMD17/CMD24) of the MMC/SD protocol layer and may send or receive the EEM packet through the hardware interface controlled by the MMC/SD hardware interface driver device; if the length of the EEM packets to be sent or received is greater than BLOCK_LEN, the MMC/SD EEM layer may call the multi-block READ/WRITE command (CMD18/CMD25) of the MMC/SD protocol layer. If there is an interspace between packets, the interspace can be filled with any characters that do not interference the unpacking operation (for example, 0x0). The EEM packets can be carried by the MMC/SD blocks in any of the following ways: one EEM packet contained in one MMC/SD block; multiple EEM packets contained in one MMC/SD block; one EEM packet contained in multiple MMC/SD blocks; and multiple separated EEM packets contained in multiple MMC/SD blocks.

In addition, according to the MMC/SD protocol, it is required that the parameters of the block READ/WRITE commands (CMD17/CMD24, or CMD18/CMD25) contains the starting address of the blocks that are read/written. Accordingly, for an EEM packet, the starting address can be specified as 0. As can be appreciated by one skilled in the art, the starting address is not limited to 0, and any starting address may be employed as long as the processing at the master device and the slave device is consistent.

Although the present invention has been described in connection with the preferred embodiments described above, the implementations of the present invention are not limited to above embodiments. Rather, it should be understood that various alterations and modifications could be made by one skilled in the art without departing from the spirit or scope of this invention.

The invention claimed is:

1. An Ethernet communication system based on a multimedia card/secure digital memory card (MMC/SD) interface, comprising:
  at least one master device and at least one slave device, wherein
  the at least one master device and the at least one slave device are connected through the MMC/SD interface and communicate with each other over an Ethernet configured network, and
  each of the at least one master device includes a master controller, a master communication protocol stack device, and a master MMC/SD physical interface driver device,
  the master controller being used for controlling the operation of the master communication protocol stack device and the master MMC/SD physical interface driver device,
  the master communication protocol stack device being used for transmitting and receiving the information for the at least one master device, the master MMC/SD physical interface driver device being used for the transmission of the MMC/SD signaling on the MMC/SD interface, and wherein, when the at least one slave device sends application data to the at least one master device, the at least one slave device puts the application data into a transmission buffer to wait for the at least one master device to receive it as a result of a periodic polling.

2. The Ethernet communication system based on the MMC/SD interface according to claim 1, wherein, each of the at least one slave device includes a slave controller, a slave communication protocol stack device, and a slave MMC/SD physical interface driver device, wherein the slave controller is used for controlling the operation of the slave communication protocol stack device and the slave MMC/SD physical interface driver device, the slave communication protocol stack device is used for transmitting and receiving the information for the slave device, and the slave MMC/SD physical interface driver device is used for the transmission of the MMC/SD signaling on the hardware interface.

3. The Ethernet communication system based on the MMC/SD interface according to claim 2, wherein, the master communication protocol stack device includes an application layer module, a transport layer module, a network layer module, a data link layer module, an MMC/SD Ethernet emulation model (EEM) layer module, and an MMC/SD protocol layer module, wherein the application layer module is used for performing network application program, the transport layer module and the network layer module are used for performing the functions of the Ethernet protocol, the data link layer module is used for performing the packaging of the Ethernet data frame, the MMC/SD EEM layer module is used for emulating the functions of the Ethernet card for the higher level of the protocol stack, and the MMC/SD protocol layer module is used for performing the functions of the MMC/SD protocol stack to implement various MMC/SD commands supported by the MMC/SD protocol stack.

4. The Ethernet communication system based on the MMC/SD interface according to claim 2, wherein, the slave communication protocol stack device includes an application layer module, a transport layer module, a network layer module, a data link layer module, an MMC/SD EEM layer module, and an MMC/SD protocol layer module, wherein the application layer module is used for performing network application program, the transport layer module and the network layer module are used for performing the functions of the Ethernet protocol, the data link layer module is used for performing the packaging of the Ethernet data frame, the MMC/SD EEM layer module is used for emulating the functions of the Ethernet card for the higher level of the protocol stack, and the MMC/SD protocol layer module is used for performing the functions of the MMC/SD protocol stack to implement various MMC/SD commands supported by the MMC/SD protocol stack.

5. The Ethernet communication system based on the MMC/SD interface according to claim 3, wherein, the data transmission format used by the MMC/SD EEM layer is the EEM packet, which includes an EEM header field and an EEM payload field.

6. The Ethernet communication system based on the MMC/SD interface according to claim 5, wherein, the EEM header field includes a first field and a second field, wherein the first field is used for defining the type of the EEM packet, and when the EEM packet is a data packet, the second field includes a check status field and a length field, and when the EEM packet is a command packet, the second field includes a command type field and a command parameter field.

7. The Ethernet communication system based on the MMC/SD interface according to claim 6, wherein, the length filed is used for specifying the length of the payload field in the EEM packet, and the check status field is used for specifying the on/off state of the CRC checking of the Ethernet data frames.

8. The Ethernet communication system based on the MMC/SD interface according to claim 7, wherein, the command type field is used for defining the type of the EEM command, and the command parameter field is used for defining the parameters of the command.

9. The Ethernet communication system based on the MMC/SD interface according to claim 8, wherein, the command type field defines the following types of command:

(1) Echo command, for verifying the validity of the connection;
(2) Echo Response command, for responding to the corresponding Echo command;
(3) ResponseHint command, transmitted by the at least one slave device, for setting the minimal time interval of stopping a query when the at least one master device stops querying data from the at least one slave device;
(4) ResponseCompleteHint command, transmitted by the at least one slave device, for notifying the at least one master device that there is no data to be transmitted now;
(5) Tickle command, transmitted by the at least one master device, for notifying the at least one slave device of the timeout of the definite time for said ResponseCompleteHint command.

10. The Ethernet communication system based on the MMC/SD interface according to claim 9, wherein, the MMC/SD protocol layer modules of the at least one master device and the at least one slave device carries the EEM packet by means of the MMC/SD block respectively in any of the following ways: one EEM packet contained in one MMC/SD block; multiple EEM packets contained in one MMC/SD block; one EEM packet contained in multiple MMC/SD blocks; and multiple separated EEM packets contained in multiple MMC/SD blocks.

11. An Ethernet communication method based on a multimedia card/secure digital memory card (MMC/SD) interface, comprising:

(A1) at least one master device and at least one slave device communicating with each other through the MMC/SD interface over an Ethernet configured network, said communicating including:
(B1) transmitting first application data from the at least one master device to the at least one slave device, the at least one master device packaging an Ethernet data packet into an Ethernet emulation model (EEM) packet through a first MMC/SD EEM layer, and sending the EEM packet to the at least one slave device through the MMC/SD interface;
(B2) transmitting second application data from the at least one slave device to the at least one master device, the at least one slave device packaging an Ethernet data packet into an EEM packet through the second MMC/SD EEM layer, and putting the EEM packet into a transmission buffer to wait for the at least one master device to receive it as a result of periodic polling.

12. The Ethernet communication method based on the MMC/SD interface according to claim 11, wherein, the step (B1) further comprises:

(C1) the transport layer and the network layer in the at least one master device processing the first application data orderly, and constructing an Ethernet data packet from the first application data;

(C2) the data link layer in the at least one master device packaging the Ethernet data packet into an Ethernet data frame;

(C3) the first MMC/SD EEM layer constructing an EEM packet from the Ethernet data frame, and selecting an appropriate MMC/SD command to transmit the EEM packet in the form of MMC/SD data blocks;

(C4) the MMC/SD protocol layer and the MMC/SD hardware interface driver device in the at least one master device processing the MMC/SD command and sending the MMC/SD data blocks to the at least one slave device;

(C5) the MMC/SD protocol layer and the MMC/SD hardware interface driver device in the at least one slave device processing the MMC/SD command to receive the MMC/SD data blocks;

(C6) the second MMC/SD EEM layer in the at least one slave device obtaining the EEM packet from the received MMC/SD data blocks, and if the EEM packet is an EEM command packet, then the second MMC/SD EEM layer using the EEM command packet itself, and if the EEM packet is an EEM data packet, the second MMC/SD EEM layer obtaining the Ethernet data frame from the EEM data packet and uploading the Ethernet data frame to the upper layer;

(C7) the data link layer of the at least one slave device obtaining the Ethernet data packet from the Ethernet data frame and uploading the Ethernet data packet to the upper layer; and (C8) the transport layer and the network layer of the at least one slave device processing the Ethernet data packet to obtain the first application data, and uploading the first application data to the upper layer.

13. The Ethernet communication method based on the MMC/SD interface according to claim 12, wherein, the step (B2) further comprises:

(D1) the transport layer and the network layer in the at least one slave device processing the second application data orderly and constructing an Ethernet data packet from the second application data;

(D2) the data link layer in the at least one slave device packaging the Ethernet data packet into an Ethernet data frame;

(D3) the second MMC/SD EEM layer in the at least one slave device constructing an EEM packet from the Ethernet data frame, and putting the EEM packet in a buffer in the form of MMC/SD data blocks to wait for the master device to read;

(D4) the first MMC/SD EEM layer in the at least one master device sending read commands in manner of periodic polling, wherein the MMC/SD protocol layer and the MMC/SD hardware interface driver layer in the at least one master device process the read command to receive the MMC/SD data blocks;

(D5) the first MMC/SD EEM layer in the at least one master device obtaining the EEM packet from the received MMC/SD data blocks, and if the EEM packet is an EEM command packet, then the first MMC/SD EEM layer using the EEM command packet itself, and if the EEM packet is an EEM data packet, the first MMC/SD EEM layer obtaining the Ethernet data frame from the EEM data packet and uploading the Ethernet data frame to the upper layer;

(D6) the data link layer of the at least one master device obtaining the Ethernet data packet from the Ethernet data frame and uploading the Ethernet data packet to the upper layer; and (D7) the transport layer and the network layer of the at least one master device processing the Ethernet data packet to obtain the second application data, and uploading the second application data to the upper layer.

14. The Ethernet communication method based on the MMC/SD interface according to claim 13, wherein, the Ethernet data packet is an IP data packet.

15. The Ethernet communication method based on the MMC/SD interface according to claim 13, wherein, the data transmission format employed by the MMC/SD EEM layer is an EEM packet, which includes an EEM header field and an EEM payload field.

16. The Ethernet communication method based on the MMC/SD interface according to claim 15 wherein, the EEM header field includes a first field and a second field, wherein the first field is used for defining the type of the EEM packet, and when the EEM packet is a data packet, the second field includes a check status field and a length field, and when the EEM packet is a command packet, the second field includes a command type field and a command parameter field.

17. The Ethernet communication method based on the MMC/SD interface according to claim 16, wherein, the length filed is used for specifying the length of the payload field in the EEM packet, and the check status field is used for specifying the on/off state of the CRC checking of the Ethernet data frames.

18. The Ethernet communication method based on the MMC/SD interface according to claim 17, wherein, the command type field is used for defining the type of the EEM command, and the command parameter field is used for defining the parameters of the command.

19. The Ethernet communication method based on the MMC/SD interface according to claim 18, wherein, the MMC/SD protocol layer of the at least one master device and the at least one slave device carries the EEM packet with the MMC/SD block respectively in any of the following ways: one EEM packet contained in one MMC/SD block; multiple EEM packets contained in one MMC/SD block; one EEM packet contained in multiple MMC/SD blocks; and multiple separated EEM packets contained in multiple MMC/SD block.

* * * * *